United States Patent [19]

Horikawa et al.

[11] Patent Number: 4,723,100
[45] Date of Patent: Feb. 2, 1988

[54] BRUSHLESS MOTOR WITH A ROTOR POLE POSITION DETECTOR ASSOCIATED WITH EACH ARMATURE WINDING AND ELECTRICALLY CONNECTED TO ANOTHER ARMATURE WINDING

[75] Inventors: Kazuo Horikawa; Yoshiaki Ishino; Takenori Tomita, Kanagawa, all of Japan

[73] Assignee: Fuji Photo Film Co., Ltd., Kanagawa, Japan

[21] Appl. No.: 744,440

[22] Filed: Jun. 13, 1985

[30] Foreign Application Priority Data

Jun. 13, 1984 [JP] Japan .................................. 59-121634

[51] Int. Cl.$^4$ .................................................. H02P 6/02
[52] U.S. Cl. ...................................... 318/254; 318/138
[58] Field of Search ........................ 318/138, 254, 439

[56] References Cited
U.S. PATENT DOCUMENTS 4,382,214  5/1983  Ban et al. ............................ 318/254
4,459,520  7/1984  Wada .................................. 318/254
4,484,115 11/1984  Takahashi ........................... 318/254

Primary Examiner—Bernard Roskoski
Assistant Examiner—Bentsu Ro
Attorney, Agent, or Firm—Sughrue, Mion, Zinn, Macpeak and Seas

[57] ABSTRACT

A brushless motor includes a plurality of stator armature windings having winding frames with spaces defined therein, respectively, a rotor mounted on a rotatable shaft and having field poles rotatable with respect to the armature windings, and a plurality of rotor position detectors such as Hall-effect devices disposed in the spaces, respectively, and having output terminals connected respectively to the input terminals of other armature windings, for continuously varying the currents flowing through the other armature windings dependent on signals indicative of the magnetic fluxes from the field poles as detected by the rotor position detectors.

6 Claims, 9 Drawing Figures

BRUSHLESS MOTOR WITH A ROTOR POLE POSITION DETECTOR ASSOCIATED WITH EACH ARMATURE WINDING AND ELECTRICALLY CONNECTED TO ANOTHER ARMATURE WINDING

BACKGROUND OF THE INVENTION

The present invention relates to a brushless motor, and more particularly to a brushless motor composed of rotatable field poles, a plurality of armature windings disposed in confronting relation to the field poles and having winding frames defining spaces therein, and flux detector means such as Hall-effect devices positioned in the spaces, respectively, for repeatedly applying electric signals indicative of magnetic fluxes as detected by the Hall-effect devices to the other armature windings to enable the brushless motor to generate a torque in proportion to the magnetic fluxes.

There are widely used transistorized brushless DC motors in which the brush and commutator in ordinary DC motors are replaced with detectors for detecting rotor pole positions and transistor inverters. Dependent on the position of the rotor, the transistor inverters are energized or de-energized to pass currents through stator windings for generating torques between the stator windings and the rotor poles to rotate the rotor. The rotor pole position detectors may comprise proximity switches, photoelectric transducers, rotary transformers, or magnetism-sensitive devices such as Hall-effect devices. Where Hall-effect devices are utilized for detecting the rotor pole positions, the brushless motor is relatively small in size and hence used in a variety of arrangements which are required to be compact in overall size.

One known DC motor employing Hall-effect devices is illustrated in FIG. 1 of the accompanying drawings. The DC motor, generally designated by the reference numeral 8, of a two-phase construction has a rotor 2 composed of permanent magnets, two pairs of stator (armature) windings 4a, 4b and 4c, 4d disposed around the rotor 2, and a pair of Hall-effect devices 6a, 6c positioned adjacent to the stator windings 4a, 4c, respectively, and having four terminals. When the output currents from transistors energized by a transistor chopper are passed through the stator windings 4a, 4b and 4c 4d, the rotor 2 is rotated, and the Hall-effect devices 6a, 6c generate voltages based on the output currents from the transistors and the direction of the magnetic field produced by the rotor 2. The voltages generated by the Hall-effect devices 6a, 6c are useful for detecting the direction in which the rotor 2 rotates.

When the two-phase DC motor with the Hall-effect devices rotates at high speeds, the rotor is subject to a substantial inertial force and the output motor torque is rendered smooth. However, when such a DC motor with a relatively small number of phases is rotated at low speeds, no sufficient inertial force is produced and hence the output motor torque becomes irregular. This has led to a drawback that the DC motor requires complex controls.

In view of the foregoing deficiency, the applicant developed a brushless motor which is suitable for low-speed rotation, can produce an increased starting torque, and lends itself to accurate control for rotation. The applicant filed Japanese Patent Application No. 56-110170 entitled "Brushless motor having seven or more armature windings" based on the invention directed to the developed brushless motor. A U.S. Patent Application filed claiming Convention Priority based on the above Japanese Patent Application has already issued as U.S. Pat. No. 4,484,115. The applicant also filed Japanese Utility Model Application No. 57-186220 on a disk-type brushless motor. This disk-type brushless motor can be more compact and hold a current loss to a minimum for an improved motor efficiency. Since the brushless motor of this type is particularly suitable for low-speed operation and can easily be controlled, it would preferably be employed in an irradiation image recording and read-out apparatus utilizing a stimulable phosphor sheet, which the applicant has developed. More specifically, as disclosed in Japanese Laid-Open Patent Publications Nos. 55-12429 and 56-11395, for example, the stimulable phosphor, when exposed to an irradiation such as X-rays, $\alpha$-rays, $\beta$-rays, $\gamma$-rays, cathode rays, or ultraviolet rays, stores a part of the energy of the irradiation. When the stimulable phosphor exposed to the irradiation is exposed to stimulating rays such as visible light, the stimulable phosphor emits light in proportion to the stored energy of the irradiation. For reading out an irradiation image stored in the stimulable phosphor sheet by exposing it to a laser beam, for example, the stimulable phosphor sheet is required to be fed along at a considerably low speed. The disk-type brushless motor is suitable for feeding the stimulable phosphor sheet at low speeds.

The polyphase brushless motor has an increased number of stator armatures with respect to field poles and Hall-effect devices disposed near the armatures. Although the rotor rotates smoothly at a low speed, it is not controlled highly efficiently in relation to the generated torque, i.e., the rotor is not rotated under the torque proportional to the magnetic flux produced.

SUMMARY OF THE INVENTION

In view of the foregoing shortcomings with the conventional brushless motors, it is an object of the present invention to provide a brushless motor which can be rotated at an ultra low speed and highly accurately, and can produce a high torque.

According to the present invention, there is provided a brushless motor including a plurality of stator armature windings having winding frames with spaces defined therein, respectively, a rotor mounted on a rotatable shaft and having field poles rotatable with respect to the armature windings, and a plurality of rotor position detectors disposed in the spaces, respectively, and having output terminals connected respectively to the input terminals of other armature windings, for continuously varying the currents flowing through the other armature windings dependent on signals indicative of the magnetic fluxes from the field poles as detected by the rotor position detectors.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

The mechanical construction of a brushless motor according to the present invention will first be described briefly.

Figure 1:
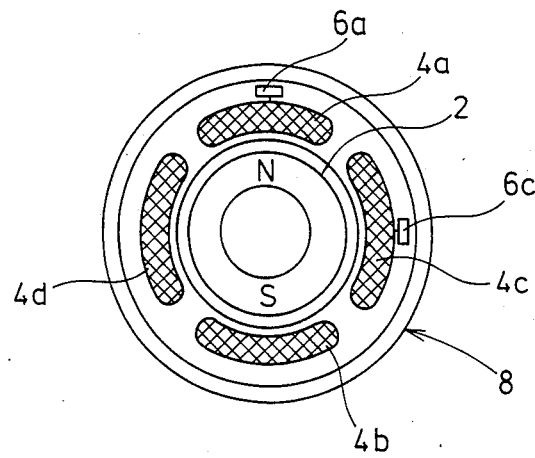
FIG. 1 is a plan view of a conventional brushless motor.
Figure 2:
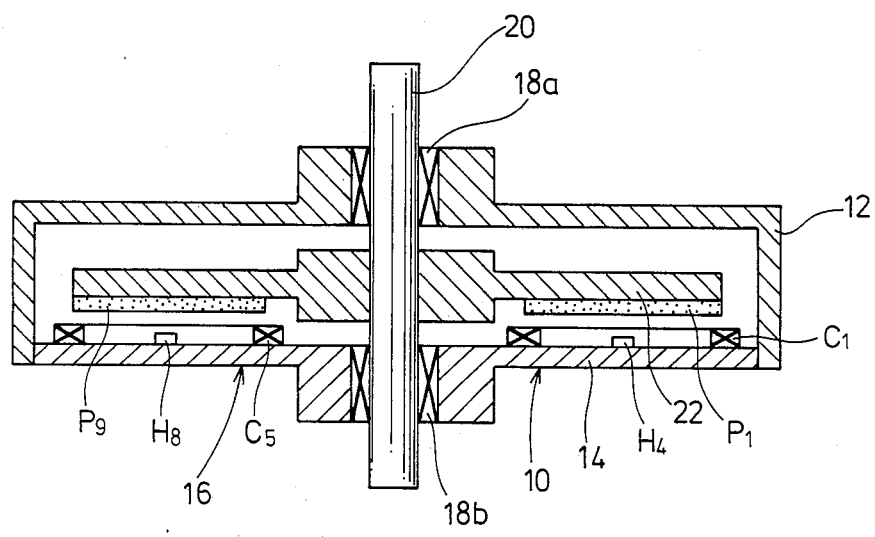
FIG. 2 is a cross-sectional view of a brushless motor according to the present invention.
Figure 3:
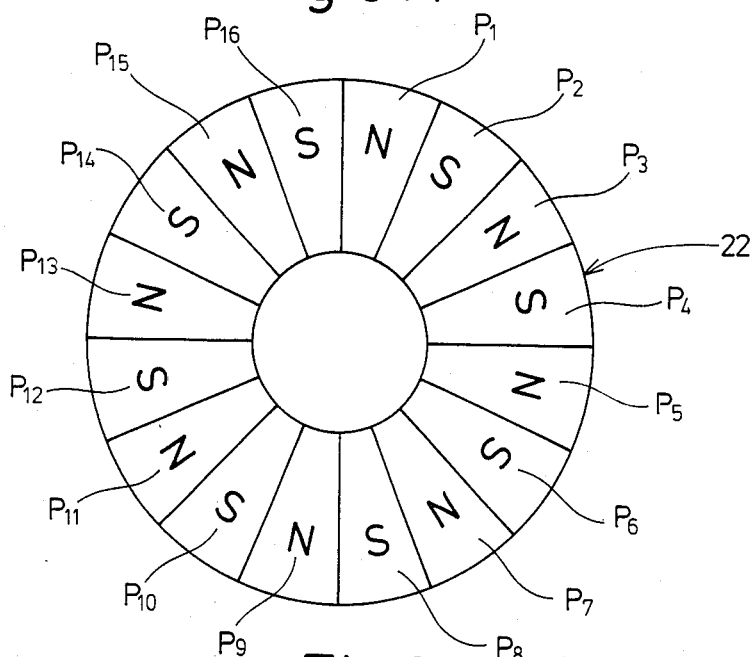
FIGS. 3A and 3B are plan views of field poles and armature windings, respectively.
Figure 3:
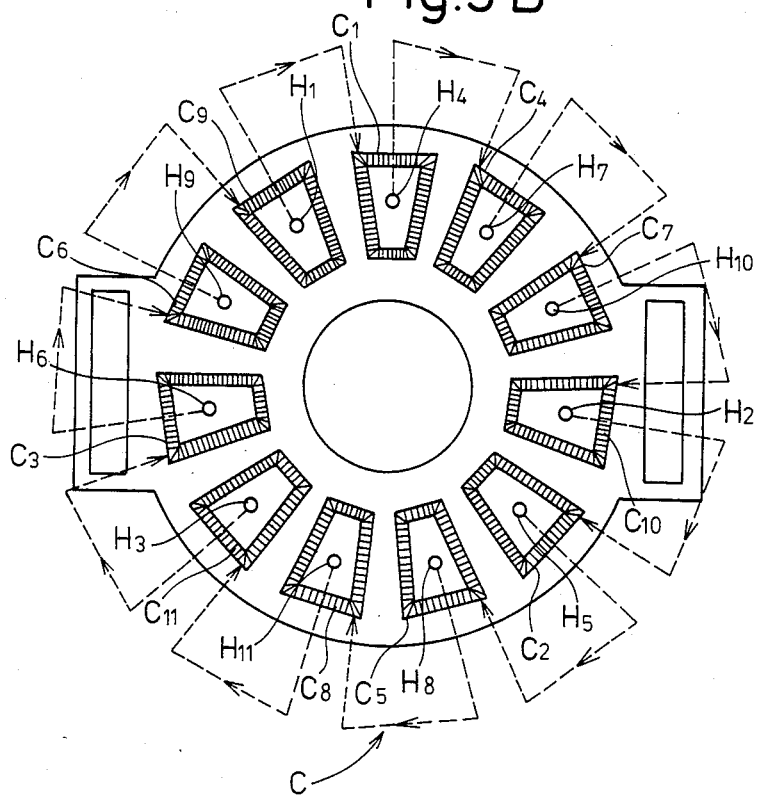
Figure 4:
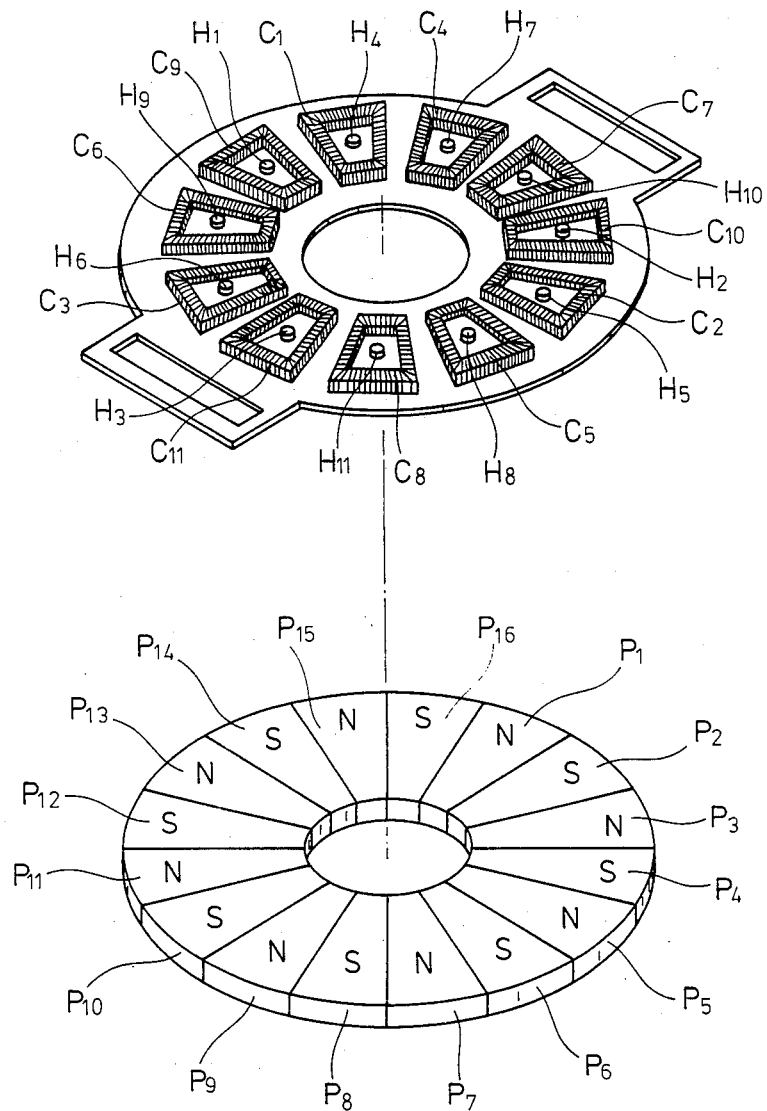
FIG. 4 is an exploded perspective view showing the field poles and the armature windings.

The reference numeral 10 in FIG. 2 generally designates a brushless motor having an axially flat configuration. The brushless motor 10 includes a brushless motor housing 16 composed of a flat cup-shaped casing 12 formed by pressing an aluminum sheet and a disk-shaped cover 14 made of mild steel and force-fitted in the lower open end of the casing 12. Bearings 18$a$, 18$b$ are fixedly mounted centrally in the casing 12 and the cover 14, respectively. A rotatable shaft 20 is rotatably supported by the bearings 18$a$, 18$b$ on the casing 12 and the cover 14. The brushless motor 10 also includes a disk-shaped rotor 22 made of mild steel and mounted on the shaft 20 within the brushless motor housing 16. As shown in FIG. 3A, an annular pattern of sixteen (16) field poles P1 through P16 is fixed to one axial surface of the rotor 22, the field poles P1 through P16 being magnetized flatwise alternately as N and S poles as described later on. Armature windings C1 through C11 arranged successively in an annular pattern are mounted on the inner axial surface of the cover 14 as shown in FIGS. 2 and 3, the armature windings C1 through C11 being disposed in axially confronting relation to the field poles P1 through P16 for relative angular movement. The armature windings C1 through C11 have winding frames defining spaces or cavities therein with position detectors fixedly positioned therein, respectively. Each of the position detectors comprises a Hall-effect device having four terminals. Since the eleven (11) armature windings C1 through C11 are mounted on the cover 14, a total of eleven Hall-effect devices H1 through H11 are fixedly mounted in the armatures windings C1 through C11 on the cover 14.

The position detectors or Hall-effect devices H1 through H11 can detect the polarities and flux densities of the field poles P1 through P16, and have an inherent ability to determine the magnitudes of electric currents which should be passed, in one direction or the other, through other armature windings. Stated otherwise in relation to torques, the Hall-effect devices H1 through H11 detect the magnetic fluxes, generate voltages proportional to the detected magnetic fluxes, and apply the generated voltages to the other armature windings in a repetitive cyclic manner, so that the rotor 22 can be rotated under torques commensurate with the detected magnetic fluxes.

According to the present invention, the Hall-effect devices H1 through H11 are disposed substantially centrally in the armature windings C1 through C11, respectively, and positioned such that they can detect magnetic fluxes in phase with the currents in those armature windings to which the output signals from the Hall-effect devices are applied. The sixteen (16) field poles of the invention have a total electrical angle of 2880°, which means that each field pole has an angular interval equal to a mechanical angle of 22.5° (see FIG. 6).

The eleven (11) armature windings C1 through C11 are disposed flatwise radially on the cover 14 as described above. The armature windings C1 through C11 have electrical and mechanical angles as follows: The electrical angle of each armature winding is given by:

$$2880°/11 = 261.81818°$$

The mechanical angle of each armature winding is given by:

$$360°/11 = 32.72727°$$

Therefore, any two adjacent armature windings are angularly spaced from each other by the electrical angle of 261.81818° or by the mechanical angle of 32.72727°.

Figure 5:
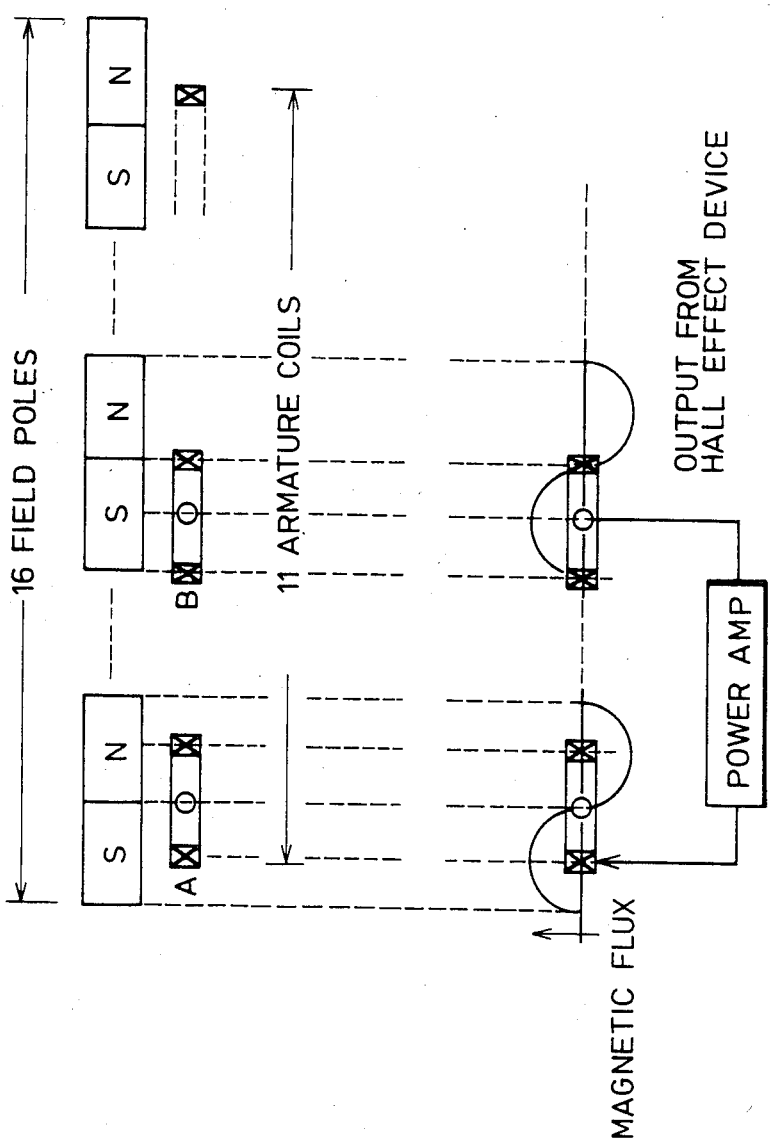
FIG. 5 is a schematic diagram illustrating the relationship between armature windings, Hall-effect devices, field poles, and magnetic fluxes.

The inventor has found that when an armature winding and a field pole are positioned in confronting relation to each other in the intervals of equal mechanical and electrical angles, the Hall-effect device will detect a maximum magnetic flux and generate a corresponding current. If the generated current is supplied to the armature winding which is positioned with as small a phase deviation as possible, then the field poles can be rotated with a high torque. For example, the armature coil which is subject to a maximum magnetic flux in the position A in FIG. 5 is supplied with a current fed through a power amplifier from the Hall-effect device which is subject to a maximum magnetic flux in the position B that is in phase with the position A. Therefore, the motor is driven by passing flux-dependent currents through the armature coils.

Figure 6:
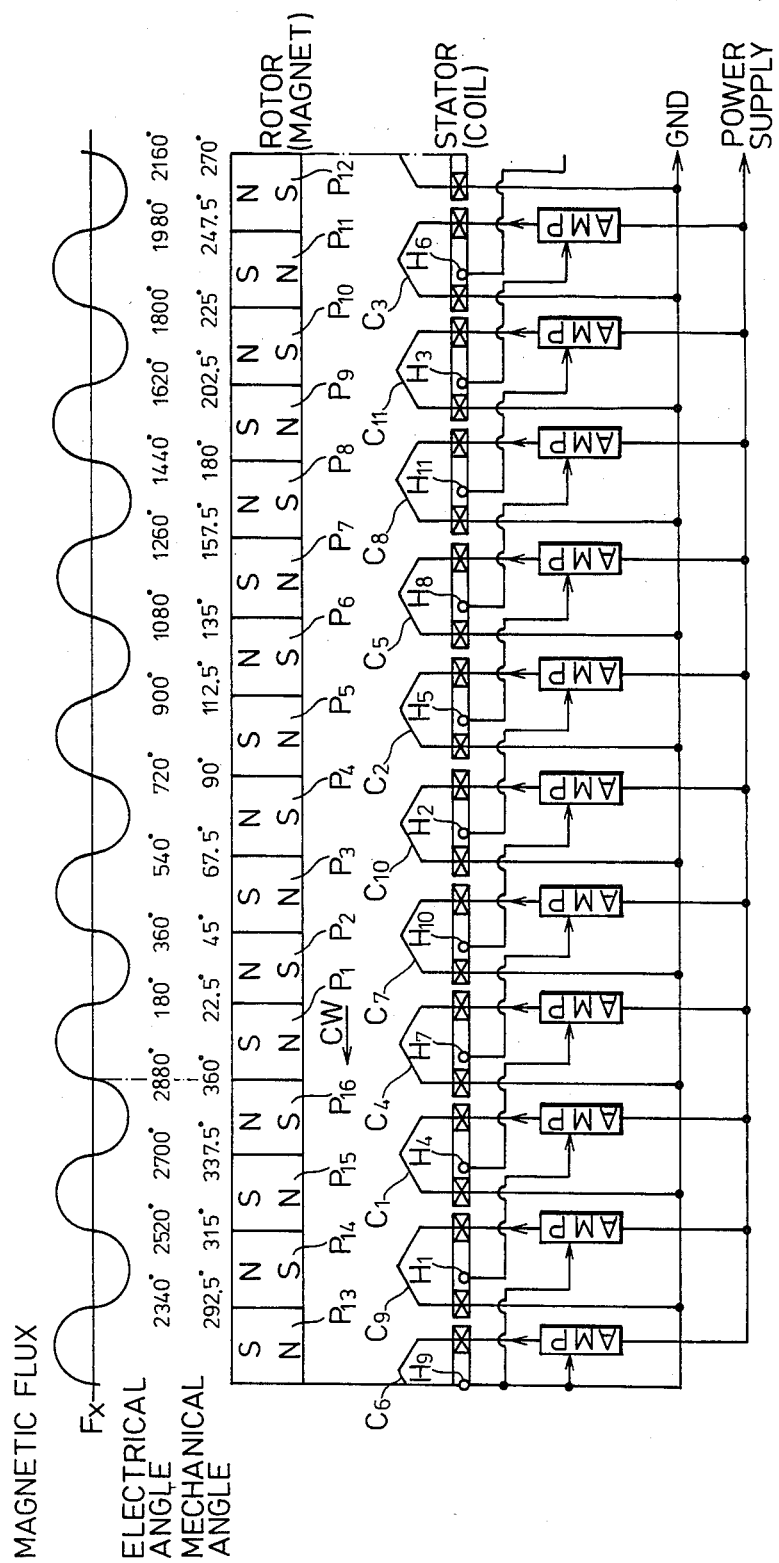
FIG. 6 is a schematic diagram showing the relative positional relationship between the field poles, the armature windings, and the Hall-effect devices in the brushless motor of the present invention.

More specifically, when the field pole P1 and the armature winding C4 fully face each other as shown in FIG. 6, the Hall-effect device H7 can detect a maximum magnetic flux as can easily be understood from the waveform representing the magnetic flux Fx. The Hall-effect device H7 then supplies a maximum current generated upon detection of the maximum magnetic flux to the adjacent armature winding C7 which is subject to a maximum magnetic flux. The field poles can then be rotated with a maximum torque since there is no phase deviation between the magnetic flux and the current with respect to the armature winding C7 positioned between the field poles P2, P3 as indicated by the waveform of the magnetic flux Fx.

However, the armature winding C7 is actually out of phase positionally when the field pole P1 and the armature winding C4 fully confront each other because the armature windings C1 through C11 are required to face the field poles in equal angular intervals. The phase deviation at maximum is within an electrical angle of 360° and hence a mechanical angle of 45°.

Figure 7:
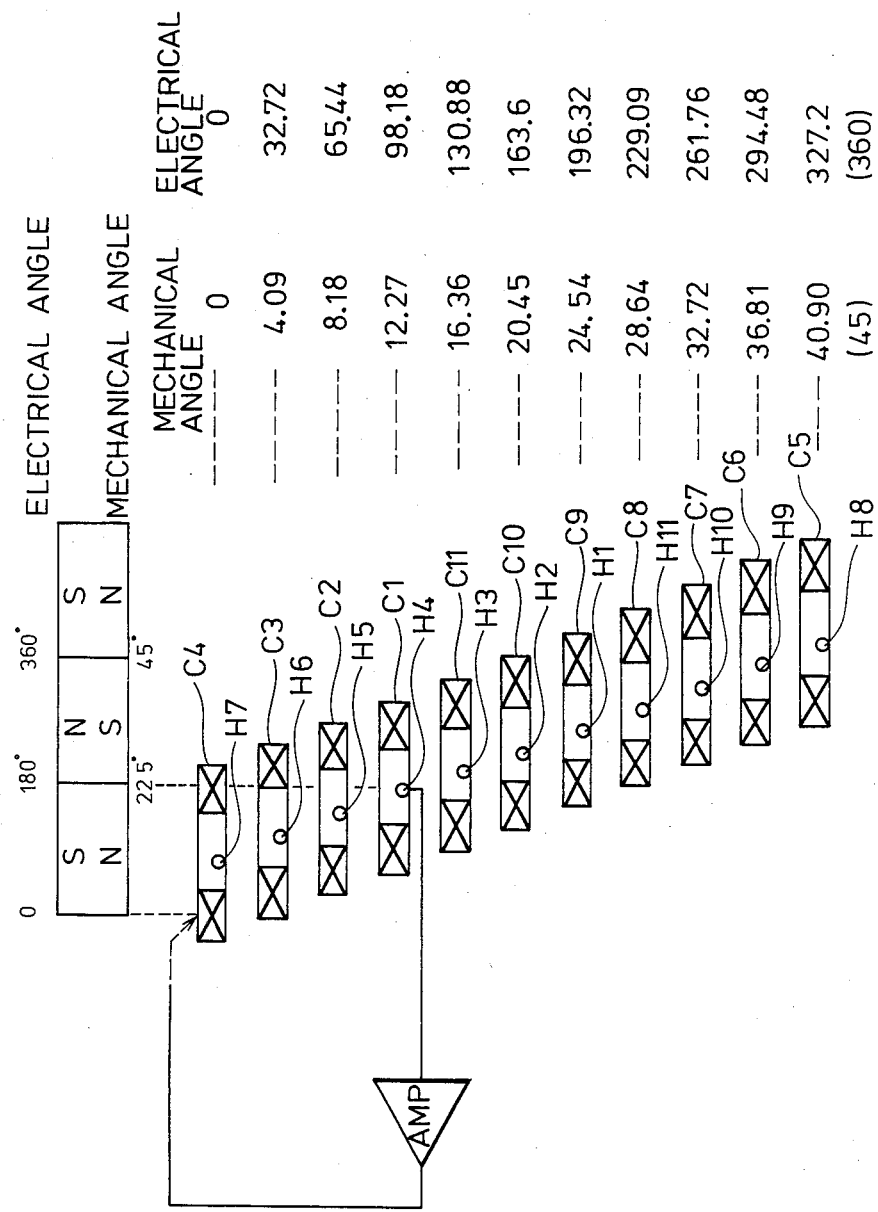
FIG. 7 is a schematic diagram showing the positions of all of the armature windings relatively to a field pole at the time one armature winding is located right in confronting relation to one field pole.
Figure 8:
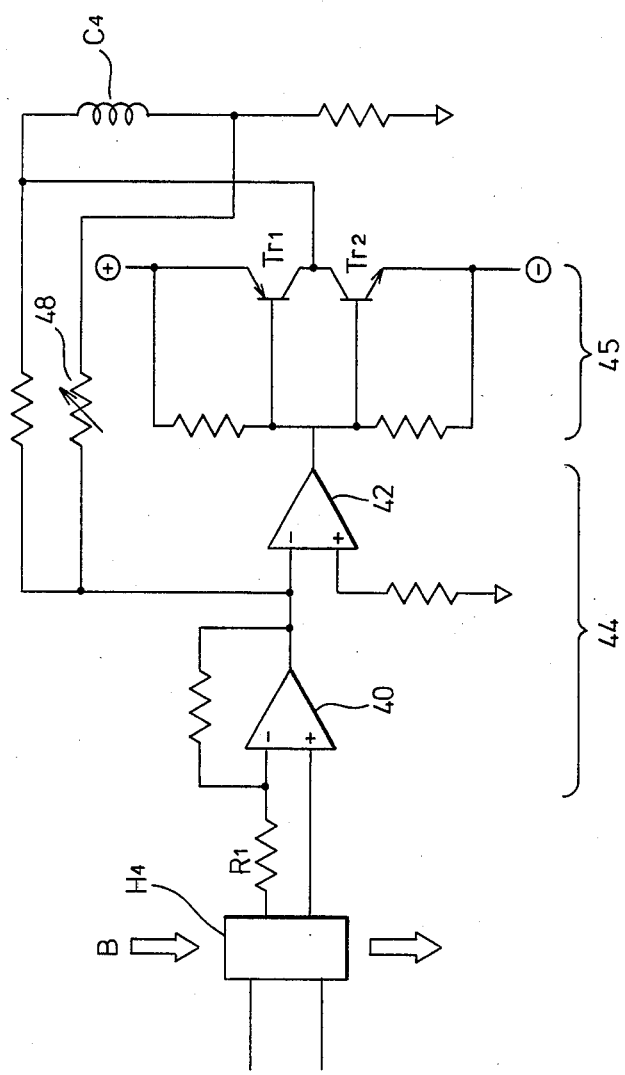

Assuming that the armature winding C4 is disposed in fully confronting relation to the field pole P1, the other armature windings are successively angularly spaced by an electrical angle of 360°/11≈32.72° or a mechanical angle of 4.09°. Since the armature windings are successively angularly spaced from the field poles, the armature winding C5 is eventually angularly spaced an electrical angle of 327.2° from the corresponding field pole (see FIG. 7).

By positioning the Hall-effect devices in the armature winding spaces so as to absorb or eliminate the above positional deviations or angular spacings, the Hall-effect device can detect a maximum magnetic flux. For example, when the armature winding C4 and the field pole P1 are disposed in fully face-to-face relation to each other, the armature winding C1 in which the phase difference between the current and the magnetic flux is minimum is angularly spaced from the corresponding field pole by a mechanical angle of 12.27° and an electrical angle of 98.18° and from the fully confronting position by a mechanical angle of 12.27°−11.25°=1.02° and an electrical angle of 98.18°−90°=8.18° (see FIG. 6).

The Hall-effect devices should therefore be positioned to absorb the above positional deviation. As shown in FIGS. 5 and 6, the Hall-effect devices are disposed in the respective armature winding spaces at a position which is about 1° spaced from the centers of the armature windings in the clockwise direction in which the rotor rotates, for detecting maximum magnetic fluxes.

The general formula for determining the angular deviation $\theta°$ of the position in which the Hall-effect device is to be located is as follows:

$$\theta° = \frac{\left| \frac{360}{l} a - \frac{\pi}{2} K \right|}{P/2}$$

$$= \frac{\frac{4\pi}{l} a - \pi K}{P}$$

$$= \frac{1}{P}\left(\frac{\pi}{l}\right)(4a - lK)$$

$$= \pi(4a - lK)/Pl$$

where
- $l$ = the number of coil phases = $2m+1$ ($m = 1, 2 \ldots$)
- $P$ = the number of poles = $2n$ ($n = 1, 2 \ldots$),
- $a$ = the difference (0, 1, 2, 3 ... −1) between the number of coils with driving Hall-effect devices disposed therein and the number of coils which are driven, and
- $K = 1$ or 3. The phase difference between the coils with driving Hall-effect devices disposed therein and the coils which are driven are required to be $\pi/2$ or $\pi/3$ at all times. Therefore, K is substantially 1 or 3.

For sixteen (16) field poles and eleven (11) coil phases in the illustrated embodiment, the angular deviation $\theta°$ is computed as follows:

$$\theta° = \frac{\pi(4a - lK)}{P \times l}$$

$$= \frac{\pi\{4 \times (4 - 1) - 11 \times 1\}}{16 \times 11}$$

$$= \frac{\pi}{176} = 1.02°$$

K is selected to be 1 assuming that the phase deviation is $\pi/2$.

If K is selected to be 3, i.e., the phase deviation is $3\pi/2$, then $$\theta° = \frac{(4 \times 8 - 11 \times 3)}{176} = \frac{-\pi}{176} = -1.02°$$

For sixteen (16) field poles and nine (9) coil phases, the angular deviation $\theta°$ is computed as follows:

$$\theta° = \frac{\pi\{4 \times (3 - 1) - 9 \times 1\}}{16 \times 9} = \frac{-\pi}{144} = -1.25°$$

If K is 3, then $$\theta° = \frac{\pi\{4 \times (8 - 1) - 9 \times 3\}}{16 \times 9} = \frac{\pi}{144} = 1.25°$$

When the number of field poles is 16 and the number of coil phases is 9, therefore, the Hall-effect devices should be displaced from the centers of the armature windings, respectively, by −1.25° or +1.25° in the direction in which the field poles rotate.

With the present invention, the Hall-effect devices are disposed in the respective positions to absorb or eliminate the positional deviations.

An output control circuit to be connected to each of the Hall-effect devices may be any one of a number of conventional amplifying devices used to amplify the output of its respective Hall-effect device. Examples of such amplifying circuit are described in the hereinbefore referenced Japanese Patent Application No. 110170 (which corresponds to U.S. Pat. No. 4,484,115 and Japanese Utility Model Application No. 57-186220.

Operation of the brushless motor acccording to the present invention is as follows:

When a switch (not shown) is turned on to pass armature currents through the armature windings C1 through C11 of the brushless motor 10, the field poles P1 through P16 are pulled by the armature windings C1 through C11 since the magnetic fluxes produced by the field poles P1 through P16 cross the armature currents. Therefore, the rotor 22 to which the field poles are fixed is rotated about the shaft 20. At this time, the Hall-effect devices H1 through H11 disposed in the armature windings C1 through C11 produce voltages proportional to the magnetic fluxes of the field poles P1 through P16. Each of the Hall-effect devices H1 through H11 applies the produced voltage to its respective output control circuit, AMPS, as shown in FIG. 6. As as result, the amplified voltage proportional to the magnetic flux detected by the Hall-effect device H4 is impressed on the following armature winding C4 (FIG. 3B) to produce a torque dependent on the magnetic flux detected by the Hall-effect device H4. The other armature windings are also successively supplied with the voltages dependent on the magnetic fluxes detected by the other Hall-effect devices. The brushless motor 10 is therefore rotated by a torque which is the sum of the torques produced dependent on the detected magnetic fluxes.

With the arrangement of the present invention, as described above, the magnetic fluxes generated by the field poles on the rotor are detected by the rotor position detectors or Hall-effect devices to produce armature currents which are fed to the other armature windings for thereby generating torques proportional to the detected magnetic fluxes. The brushless motor of the present invention can therefore be rotated smoothly without dependency on inertial forces even when the motor rotates at low speeds.

The brushless motor of the invention can be utilized for feeding a stimulable phosphor sheet with an irradiation image stored thereon smoothly and stably at an ultra low speed to allow the irradiation image to be read out highly accurately.

Although a certain preferred embodiment has been shown and described, it should be understood that many changes and modifications may be made therein without departing from the scope of the appended claims.

What is claimed is:

1. A brushless motor comprising:
   (a) a stator;
   (b) a plurality of armature windings mounted on said stator and having winding frames with spaces defined therein, respectively;
   (c) a rotatable shaft rotatable with respect to said stator;
   (d) a rotor mounted on said rotatable shaft and having field poles rotatable with respect to said armature windings; and
   (e) a plurality of rotor position detectors disposed in said spaces, respectively, and having output terminals connected respectively to the input terminals of other armature windings, for continuously varying the currents flowing through the other armature windings dependent on signals indicative of the magnetic fluxes from the field poles as detected by said rotor position detectors.

2. A brushless motor according to claim 1, wherein each said output terminals of said rotor position detectors supplies armature current to the following armature winding, respectively.

3. A brushless motor according to claim 1, wherein said armature windings and said field poles are different in number from each other, said rotor position detectors being positioned in said spaces so as to compensate for positional deviations between the armature windings and the fieled poles when one of said armature windings and one of said field poles are positioned in fully confronting relationship to each other.

4. A brushless motor according to claim 3, wherein said rotor position detectors are positionally spaced from the centers of said armature windings, respectively, by a deviation determined by:

$$\pi(4a - lK)/Pl$$

where
   l = the number of armature windings
   P1 p = the number of field poles, P and l being prime numbers,
   a = the difference between the number of armature windings, with rotor position detectors disposed therein and the number of armature windings which are driven, and
   K = 1 or 3.

5. A brushless motor according to claim 1, wherein each of said rotor position detectors comprises a Hall-effect device.

6. A brushless motor comprising:
   (a) a stator;
   (b) a plurality of armature windings mounted on said stator and having winding frames with spaces defined therein, respectively;
   (c) a rotatable shaft rotatable with respect to said stator;
   (d) a rotor mounted on said rotatable shaft and having field poles rotatable with respect to said armature windings; and
   (e) a plurality of rotor position detectors disposed in said spaces, respectively, and having output terminals connected respectively to the input terminals of other armature windings, for continuously varying the currents flowing through the other armature windings dependent on signals indicative of the magnetic fluxes from the field poles as detected by said rotor position detectors; wherein
   (f) said armature windings and said field poles are different in number from each other, said rotor position detectors being positioned in said spaces so as to compensate for positional deviations between the armature windings and the field poles when one of said armature windings and one of said field poles are positioned in fully confronting relationship to each other;
   (g) said rotor position detectors are positionally spaced from the centers of said armature windings, respectively, by a deviation determined by;

$$\pi(4a - LK)/Pl$$

where
   l = the number of armature windings,
   P = the number of field poles, P and l being prime numbers,
   a = the difference between the number of armature windings with rotor position detectors disposed therein and the number of armature windings which are driven,
   K = 1 or 3; and
   (h) said armature windings are eleven (11) in number and said field poles are sixteen (16) in number, each of said rotor position detectors being angularly spaced about 1° from the center of the respective armature winding.

* * * * *